United States Patent
An et al.

(10) Patent No.: US 10,217,999 B2
(45) Date of Patent: Feb. 26, 2019

(54) RECHARGEABLE LITHIUM BATTERY

(71) Applicant: SAMSUNG SDI CO., LTD., Yongin-si, Gyeonggi-do (KR)

(72) Inventors: Jung-Woo An, Yongin-si (KR); Jeong-Woo Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 102 days.

(21) Appl. No.: 15/240,950

(22) Filed: Aug. 18, 2016

(65) Prior Publication Data

US 2017/0155143 A1 Jun. 1, 2017

(30) Foreign Application Priority Data

Nov. 30, 2015 (KR) ........................ 10-2015-0169368

(51) Int. Cl.
*H01M 4/505* (2010.01)
*H01M 4/136* (2010.01)
*H01M 4/62* (2006.01)
*H01M 4/131* (2010.01)
*H01M 4/525* (2010.01)
*H01M 4/58* (2010.01)
*H01M 10/0525* (2010.01)
*H01M 4/02* (2006.01)

(52) U.S. Cl.
CPC ........... *H01M 4/505* (2013.01); *H01M 4/131* (2013.01); *H01M 4/136* (2013.01); *H01M 4/525* (2013.01); *H01M 4/5825* (2013.01); *H01M 4/625* (2013.01); *H01M 10/0525* (2013.01); *H01M 2004/021* (2013.01); *H01M 2004/028* (2013.01)

(58) Field of Classification Search
CPC .. H01M 4/505; H01M 10/0525; H01M 4/131; H01M 4/136; H01M 4/525; H01M 4/5825; H01M 4/625; H01M 2004/028
See application file for complete search history.

(56) References Cited

U.S. PATENT DOCUMENTS

| | | |
|---|---|---|
| 2007/0292756 A1 | 12/2007 | Tsuchiya |
| 2011/0081577 A1* | 4/2011 | Gozdz ............... H01M 4/13 429/221 |
| 2012/0231337 A1* | 9/2012 | Miyata ............... C08J 3/05 429/217 |
| 2013/0143125 A1 | 6/2013 | Tsujiko et al. |
| 2013/0252100 A1 | 9/2013 | Lee et al. |
| 2014/0295275 A1* | 10/2014 | Kay ............... C01B 25/375 429/220 |
| 2015/0064549 A1 | 3/2015 | Pinnell et al. |

FOREIGN PATENT DOCUMENTS

| | | |
|---|---|---|
| JP | 2001-357872 A | 12/2001 |
| JP | 2003-68365 A | 3/2003 |
| JP | 2004-296431 A | 10/2004 |
| JP | 2013-222584 A | 10/2013 |
| JP | 5590424 B2 | 9/2014 |
| KR | 10-2007-0120051 A | 12/2007 |
| KR | 10-2013-0107927 A | 10/2013 |

OTHER PUBLICATIONS

EPO Extended Search Report dated Feb. 27, 2017, for corresponding European Patent Application No. 16200036.8 (12 pages).
Abstract and Machine English Translation of JP 2001-357872 A, Dec. 26, 2001, 14 pages.
EPO Office Action dated Mar. 21, 2018, for corresponding European Patent Application No. 16200036.8 (5 pages).
EPO Office Action dated Aug. 24, 2018, for corresponding European Patent Application No. 16200036.8 (3 pages).

* cited by examiner

*Primary Examiner* — Muhammad S Siddiquee
(74) *Attorney, Agent, or Firm* — Lewis Roca Rothgerber Christie LLP

(57) ABSTRACT

A rechargeable lithium battery includes a negative electrode and a positive electrode, where a specific surface area per a unit area of the positive electrode is twice to seven times larger than a specific surface area per a unit area of the negative electrode. The rechargeable lithium battery has high rate capability and improved cycle-life characteristics.

14 Claims, 1 Drawing Sheet

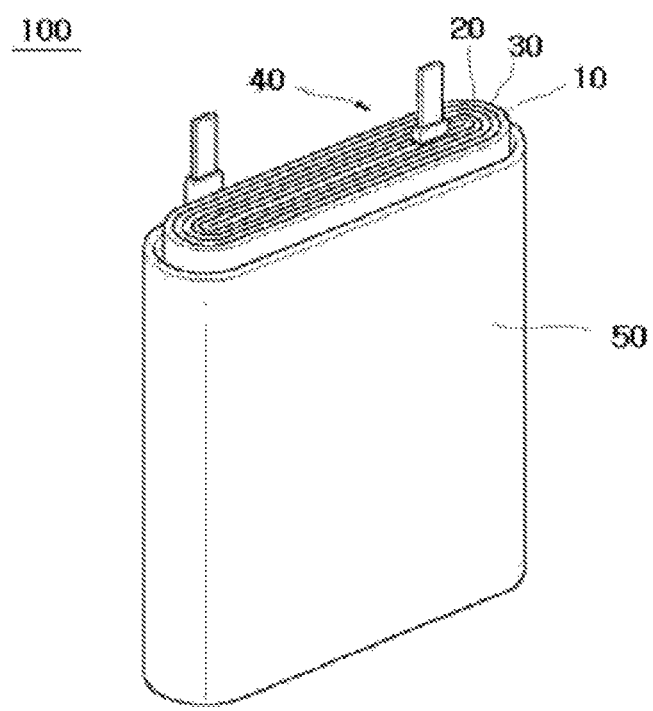

RECHARGEABLE LITHIUM BATTERY

CROSS-REFERENCE TO RELATED APPLICATION

This application claims priority to and the benefit of Korean Patent Application No. 10-2015-0169368, filed in the Korean Intellectual Property Office on Nov. 30, 2015, the entire contents of which are incorporated herein by reference.

BACKGROUND

1. Field

Embodiments of this disclosure relate to a rechargeable lithium battery.

2. Description of the Related Art

A rechargeable lithium battery includes a negative electrode, a positive electrode, and an electrolyte and generates energy through oxidation/reduction reactions when lithium ions are intercalated/deintercalated at the positive and negative electrodes. Attempts to obtain a rechargeable lithium battery having excellent cycle-life characteristics as well as excellent cycle-life characteristics by varying a kind of active material and/or additive of the positive and/or negative electrode have been actively made. For example, a method of mixing an active material with activated carbon used as a capacitor material for the positive electrode and using soft carbon having an amorphous structure as an active material for the negative electrode has been recently suggested.

SUMMARY

One embodiment provides a rechargeable lithium battery having high rate capability and improved cycle-life characteristics.

In one embodiment, a rechargeable lithium battery includes a negative electrode and a positive electrode wherein a specific surface area per a unit area of the positive electrode is about twice to about seven times as large as a specific surface area per a unit area of the negative electrode.

The specific surface area per a unit area of the positive electrode may be about three times to about six times as large as the specific surface area per a unit area of the negative electrode.

The positive electrode may be provided using a positive electrode slurry including a positive active material, activated carbon, and a positive conductive material.

Herein, the positive electrode slurry may include about 60 wt % to about 98 wt % of the positive active material, about 0.5 wt % to about 30 wt % of the activated carbon, and about 0.5 wt % to about 40 wt % of the positive conductive material, based on the total amount of the positive electrode slurry.

An average specific surface area of the positive active material may be about 0.1 $m^2/g$ to about 20 $m^2/g$.

An average specific surface area of the activated carbon may be about 800 $m^2/g$ to about 3000 $m^2/g$.

An average specific surface area of the conductive material may be about 100 $m^2/g$ to about 2000 $m^2/g$.

In one embodiment, the positive active material may include at least one selected from a lithium nickel-based oxide, a lithium cobalt-based oxide, a lithium iron phosphate-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or a combination thereof.

A weight per a unit area of the positive electrode, a loading level may be about 0.001 $g/cm^2$ to about 0.100 $g/cm^2$.

In one embodiment, the negative electrode may be provided using a negative electrode slurry including a negative active material and a negative conductive material.

The negative electrode slurry may include about 70 wt % to about 98 wt % of the negative active material, and about 1.5 wt % to about 30 wt % of the negative conductive material, based on the total amount of the negative electrode slurry.

An average specific surface area of the negative active material may be about 0.1 $m^2/g$ to about 20 $m^2/g$.

An average specific surface area of the negative conductive material may be about 100 $m^2/g$ to about 2000 $m^2/g$.

A weight per a unit area of the negative electrode, a loading level may be about 0.001 $g/cm^2$ to about 0.100 $g/cm^2$.

Embodiments of the rechargeable lithium battery have charge•discharge characteristics at a high rate and cycle-life characteristics.

BRIEF DESCRIPTION OF THE DRAWING

The accompanying drawing, together with the specification, illustrates an embodiment of the subject matter of the present disclosure, and, together with the description, serves to explain principles of embodiments of the subject matter of the present disclosure. The accompanying drawing is a perspective view showing the structure of a rechargeable lithium battery according to one embodiment.

DETAILED DESCRIPTION

Hereinafter, exemplary embodiments of the present disclosure will be described in more detail, and may be easily performed by those of skill in the related art after reviewing the present disclosure. However, this disclosure may be embodied in many different forms and shall not be construed as being limited to the exemplary embodiments set forth herein.

In the drawings, parts not necessary for understanding the description are not provided for purposes of clarity of the described embodiments, and the same or similar constituent elements are indicated by the same reference numeral throughout the specification.

Sizes and thicknesses of each member in drawings are shown for convenience, and this disclosure is not limited thereto.

In addition, unless explicitly described to the contrary, the word "comprise" and variations such as "comprises" or "comprising" will be understood to imply the inclusion of stated elements but not the exclusion of any other elements.

Embodiments of the present disclosure provide a rechargeable lithium battery having high power and excellent cycle-life characteristics, and, in some embodiments, accomplish it by adjusting a specific surface area per a unit area of the positive and negative electrodes within a set (e.g., predetermined) ratio.

In some embodiments, the specific surface area and amount of a material used to prepare respective positive and negative active material slurries, the respective loading levels of the positive and negative electrodes, and the like may have an influence (e.g., an important influence) on realizing the rechargeable lithium battery having high power and excellent cycle-life characteristics by adjusting a specific surface area per a unit area of the positive and negative electrodes.

For example, in the rechargeable lithium battery according to an exemplary embodiment, the positive electrode may have about twice to about seven times as large as specific surface area per a unit area of the negative electrode (e.g., the specific surface area per a unit area of the positive electrode may be about 2 to about 7 times as large as the specific surface area per the unit area of the negative electrode). In some embodiments, the positive electrode may have about three times to about six times as large of the specific surface area per a unit area of the negative electrode.

In general, a rechargeable lithium battery is oxidized during the charge (e.g., during charging) due to decomposition of an electrolyte solution at a positive electrode under a high voltage condition. Accordingly, the amount of the electrolyte solution injected into the positive electrode is relatively more important than the amount of the electrolyte solution injected into a negative electrode, and thus, since the electrolyte solution is limitedly used in an electrode assembly of the rechargeable lithium battery, it is important to determine an amount ratio of the electrolyte solution that is present at or in the positive and negative electrodes.

The amount ratio of the electrolyte solutions that the positive and negative electrodes have may be determined by suitably or appropriately adjusting a final specific surface area ratio of the positive and negative electrodes to realize high rate capability and excellent cycle-life characteristics of the rechargeable lithium battery in the present disclosure.

In some embodiments, the positive and/or negative electrode is provided by coating a respective active material slurry on each current collector. In some embodiments, each active material slurry may have different specific surface areas and different amount, and thus when used to form each electrode, a loading level of the positive and/or negative electrode, which is a weight per a unit area ratio of the positive and/or negative electrode, may be adjusted. For example, the active material slurry for forming the positive electrode (the positive active material slurry) may have a specific surface area and/or amount of components (e.g., amount of active material) that are different from those of the active material slurry for forming the negative electrode (the negative active material slurry). The loading level of the positive electrode relative to the negative electrode may be adjusted by adjusting the surface areas and amounts of components (e.g., amounts of active material) of the respective active material slurries.

As aforementioned, a specific surface area per a unit area of the positive and/or negative electrode may vary depending on the specific surface area and amount of each component of the positive and negative electrodes and a loading level of each active material slurry.

Accordingly, a rechargeable lithium battery having high rate capability and remarkably improved cycle-life characteristics may be obtained by adjusting a specific surface area per a unit area of the positive electrode to be about three to about seven times as large as that of the negative electrode. As aforementioned, when the specific surface area per a unit area of the positive electrode relative to the specific surface area per a unit area of the negative electrode is within the range, the electrolyte solution is more impregnated in the positive electrode than in the negative electrode, and thus high rate capability and cycle-life characteristics of the rechargeable lithium battery may be improved due to the large amount of the electrolyte solution impregnated in an electrode plate (e.g., in the positive electrode plate) despite an oxidization at the positive electrode under a high voltage condition.

The specific surface area may be measured in a nitrogen adsorption or BET (Brunauer Emmett Teller) method as referenced in the present specification.

The accompanying drawing schematically shows the rechargeable lithium battery according to an exemplary embodiment.

Referring to the accompanying drawing, a rechargeable lithium battery 100 according to one embodiment includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

First, the positive electrode 10 is described.

The positive electrode 10 includes a current collector and a positive electrode coating layer on the current collector, and the positive electrode coating layer is formed using a positive electrode slurry including a positive active material, activated carbon, and a positive conductive material.

The positive current collector may be an aluminum foil, a nickel foil, a stainless steel foil, a titanium foil, a nickel foam, a copper foam, a polymer substrate coated with a conductive metal, or a combination thereof, but the positive current collector is not limited thereto.

The positive active material may be at least one selected from a lithium nickel-based oxide, a lithium cobalt-based oxide, a lithium iron phosphate-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or a combination thereof, but the positive active material is not limited thereto.

An amount (e.g., weight) of the positive active material may be about 60 wt % to about 98 wt %, for example, about 68 wt % to about 95 wt %, or about 75 wt % to about 95 wt %, based on the total amount (e.g., weight) of the positive electrode slurry. When the positive active material is used within the amount (e.g., weight) range, high-rate charge and discharge characteristics and cycle-life characteristics may be improved.

An average specific surface area of the positive active material may be about 0.1 $m^2/g$ to about 20 $m^2/g$. For example, the average specific surface area may be about 0.1 $m^2/g$ to about 18 $m^2/g$, about 0.1 $m^2/g$ to about 16 $m^2/g$, or about 0.1 $m^2/g$ to about 14 $m^2/g$.

When the positive active material has an average specific surface area of less than about 0.1, the positive active material has a small reaction area with respect to the electrolyte solution described herein, and thus, does not suitably or sufficiently exert capability due to a deteriorated usage rate, resultantly deteriorating initial battery capacity. In addition, when the positive active material has an average specific surface area outside of the range disclosed herein, the electrolyte solution is more fervently decomposed, and thus, battery capacity and cycle-life characteristics are deteriorated.

In addition, the positive electrode slurry may include activated carbon. The activated carbon plays a role of physically adsorbing lithium ions and transferring the adsorbed lithium ions to the positive active material. Accordingly, since an effect of using the activated carbon is further increased during high rate charge and discharge, high rate charge and discharge efficiency and cycle-life characteristics of the rechargeable lithium battery may be remarkably improved (e.g., by including the activated carbon).

An amount (e.g., weight) of the activated carbon may be about 0.5 wt % to about 30 wt %, for example, about 1 wt % to about 25 wt %, or about 2 wt % to about 17 wt %, based on the total amount (e.g., weight) of the positive electrode slurry.

When the activated carbon is used outside of the range disclosed herein, durability or energy density may be deteriorated. In addition, when the activated carbon is used in an amount less than the range, an output may not be suitably or sufficiently improved. Furthermore, since the activated carbon has high hardness, when the amount of the activated carbon is extremely increased (e.g., excessively increased), the active mass density (g/cc) of the positive electrode is deteriorated, performance may hardly be realized through a thin film, and thus, rate capability at a high rate may be deteriorated.

An average specific surface area of the activated carbon may be about 800 $m^2/g$ to about 3000 $m^2/g$, for example, about 900 $m^2/g$ to about 2500 $m^2/g$, about 850 $m^2/g$ to about 2000 $m^2/g$, or about 1000 $m^2/g$ to about 1800 $m^2/g$.

When the activated carbon has an average specific surface area outside of the range disclosed herein, activity may be excessively increased, and a side reaction at the positive electrode may be increased. In addition, when the activated carbon has a smaller average specific surface area than the range, suitable or sufficient capacitance may hardly be obtained.

Accordingly, when the activated carbon has an average specific surface area within the range, the positive active material and the activated carbon are uniformly (e.g., substantially uniformly) dispersed, and performance of the activated carbon may be exerted at a maximum (e.g., substantially a maximum), improving high-rate charge and discharge characteristics and cycle-life characteristics of the rechargeable lithium battery.

The positive conductive material improves electrical conductivity of the positive electrode. Thus, any suitable electrically conductive material can be used as a conductive agent unless it causes an undesirable or unsuitable chemical change in the rechargeable lithium battery. For example, the positive conductive material may be one or more of a carbon-based material such as natural graphite, artificial graphite, carbon black (e.g., acetylene black and/or ketjen black), a carbon fiber, and/or the like, a metal powder and/or a metal fiber of copper, nickel, aluminum silver, and/or the like, a conductive material such as a polyphenylene derivative, and/or the like, but the positive conductive material is not limited thereto.

An amount (e.g., weight) of the positive conductive material may be about 0.5 wt % to about 40 wt %, for example, about 1 wt % to about 25 wt %, or about 2 wt % to about 17 wt %, based on the total amount (e.g., weight) of the positive electrode slurry.

The amount (e.g., weight) of the positive conductive material may be suitably or appropriately adjusted depending on a kind and/or an amount of the positive active material.

An average specific surface area of the positive conductive material may be about 100 $m^2/g$ to about 2000 $m^2/g$, for example, about 150 $m^2/g$ to about 1700 $m^2/g$, about 180 $m^2/g$ to about 1500 $m^2/g$, or about 200 $m^2/g$ to about 1000 $m^2/g$.

When the positive conductive material has an average specific surface area within the range disclosed herein, the positive conductive material reacts with the positive active material, and thus, has a feature (or advantage) of forming a reaction area and transferring electrons. However, when the positive conductive material has an average specific surface area of greater than about 2000 $m^2/g$, the positive conductive material may have a problem of deteriorated dispersity due to an increased (e.g., maximized) reaction area with a binder and the electrolyte solution and may work as resistance against the positive active material during an electrical/chemical reaction. In addition, when the positive conductive material has less than about 100 $m^2/g$ of an average specific surface area, conductivity may be deteriorated, and when the conductive material is increasingly used to improve the conductivity, capacity of the resultant battery may be deteriorated.

Therefore, in a rechargeable battery according to one embodiment, the positive electrode may include a coating layer on the positive current collector formed using a positive electrode slurry including about 60 wt % to about 98 wt % of the positive active material, about 0.5 wt % to about 30 wt % of the activated carbon, and about 0.5 wt % to about 40 wt % of the positive conductive material, based on the total amount (e.g., weight) of the positive electrode slurry.

The positive electrode slurry may further include a binder as needed or desired. The binder improves binding properties of positive active material particles with one another and with a current collector. The binder may be, for example, at least one selected from polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, and nylon, but the binder is not limited thereto.

An amount (e.g., weight) of the binder may be about 0.5 wt % to about 20 wt %, for example, about 1 wt % to about 15 wt %, or about 1.5 wt % to about 10 wt %, based on the total amount (e.g., weight) of the positive electrode slurry. When the binder is used within the range, positive active material particles are well adhered to one another and show improved coating property when a positive electrode slurry including these particles is coated on a current collector.

A weight per a unit area of the positive electrode, a loading level, may be about 0.001 $g/cm^2$ to about 0.100 $g/cm^2$, for example, about 0.001 $g/cm^2$ to about 0.060 $g/cm^2$, about 0.005 $g/cm^2$ to about 0.060 $g/cm^2$, or about 0.005 $g/cm^2$ to about 0.055 $g/cm^2$.

In general, when the loading level is high, the thickness of the electrode plate is increased, and the thicker electrode plate increases the moving distance of electrons and Li ions, and thus, the thicker electrode plate reduces the high rate charge and discharge (e.g., has a disadvantageous influence on high rate charge and discharge). Accordingly, since an electrode plate formed as a thin film has a feature of good high rate charge and discharge (e.g., an advantageous influence on high rate charge and discharge), the loading level may be in a range of about 0.001 $g/cm^2$ to about 0.100 $g/cm^2$.

A negative electrode will now be described in more detail.

The negative electrode 20 includes a negative current collector and a coating layer on the negative current collector. The coating layer may be formed using a negative electrode slurry including a negative active material and a negative conductive material.

The negative current collector may be a copper foil, a nickel foil, a stainless steel foil, a titanium foil, a nickel foam, a copper foam, a polymer substrate coated with a conductive metal, or a combination thereof.

The negative active material may include a carbon-based material easily intercalating/deintercalating lithium ions and thus realizing excellent high-rate charge and discharge characteristics.

As used herein, the carbon-based material may be amorphous carbon. Since the amorphous carbon has no limited path for intercalating and deintercalating lithium ions, unlike crystalline carbon such as graphite, and hardly expands an electrode, high power characteristics, a long cycle-life, and high reversible capacity under a heat treatment, for example, heat treatment at less than or equal to about 800° C., may be obtained.

The amorphous carbon may, for example, include soft carbon (e.g., low temperature-fired carbon) or hard carbon, a mesophase pitch carbonized product, fired coke, and/or the like. For example, the carbon-based material may be soft carbon.

The soft carbon may be graphitizable carbon in which atoms are arranged to easily form a layered structure, and thus, is easily changed into a graphite structure, as a heat treatment temperature is increased. Since the soft carbon has a disordered crystal structure, as compared to graphite, and thus, substantial amounts of gate helping in and out of ions, but a less disordered crystal structure than hard carbon, the ions are easily diffused. For example, the carbon-based material may be low crystalline soft carbon.

The negative active material may be used in an amount (e.g., weight) of about 70 wt % to about 98 wt %, for example, about 80 wt % to about 97 wt %, or about 90 wt % to about 95 wt %, based on the entire amount (e.g., weight) of the negative active material.

An average specific surface area of the negative active material may be about 0.1 m$^2$/g to about 20 m$^2$/g, for example, about 0.1 m$^2$/g to about 10 m$^2$/g, about 1 m$^2$/g to about 20 m$^2$/g, about 1 m$^2$/g to about 10 m$^2$/g, or about 1 m$^2$/g to about 5 m$^2$/g.

When the negative active material has an average specific surface area within the range disclosed herein, a suitable or appropriate pore (e.g., a pore having a suitable or appropriate pore size) may be present in the negative electrode composition, a suitable or satisfactory amount of activation sites playing a role of passing or storing lithium ions connecting crystalline parts of the negative active material are produced and reduce contact resistance, thereby obtaining fast storage characteristics and low temperature high power. When a carbon-based material having an average specific surface area within the range is used as a negative active material (e.g., a low crystalline carbon-based material), excellent high rate capability and cycle-life characteristic at a high rate may be obtained.

In addition, the carbon-based material may have various suitable shapes such as, for example, a spherical shape, a sheet-shape, a flake shape, a fiber shape, and/or the like, for example, a needle shape.

The negative electrode slurry may include a negative conductive material.

The negative conductive material improves electrical conductivity of an electrode. Any suitable electrically conductive material can be used as a conductive agent unless it causes an undesirable or unsuitable chemical change in the rechargeable lithium battery. Examples of the conductive material include a carbon-based material such as natural graphite, artificial graphite, carbon black (e.g., acetylene black and/or ketjen black), a carbon fiber, and/or the like; a metal-based material such as a metal powder and/or a metal fiber of copper, nickel, aluminum, silver, and/or the like; a conductive polymer such as a polyphenylene derivative, or a mixture thereof, but the negative conductive material is not limited thereto.

An amount (e.g., weight) of the negative conductive material may be about 1.5 wt % to about 40 wt %, for example, about 1 wt % to about 30 wt %, or about 2 wt % to about 20 wt %, based on the total amount (e.g., weight) of the negative electrode slurry.

The amount (e.g., weight) of the negative conductive material may be suitably or appropriately adjusted depending on a kind of and/or an amount (e.g., weight) of the negative active material.

An average specific surface area of the negative conductive material may be about 100 m$^2$/g to about 2000 m$^2$/g, for example, about 150 m$^2$/g to about 1700 m$^2$/g, about 180 m$^2$/g to about 1500 m$^2$/g, or about 200 m$^2$/g to about 1000 m$^2$/g.

When the negative conductive material has an average specific surface area within the range disclosed herein, the negative conductive material may have a feature of forming (e.g., may advantageously form) a reaction area during a reaction with the negative active material. However, when the negative conductive material has an average specific surface area of greater than about 2000 m$^2$/g, the negative conductive material has a problem of deteriorated dispersity due to an increased (e.g., maximized) reaction area with the binder and the electrolyte solution and may work resistance against the negative active material during the electrical/chemical reaction. In addition, when the negative conductive material has an average specific surface area of less than about 100 m$^2$/g, conductivity may be deteriorated, and when the conductive material is increasingly used, battery capacity may be deteriorated.

The negative electrode slurry may include about 70 wt % to about 98 wt % of the negative active material and about 1.5 wt % to about 40 wt % of the negative conductive material based on the total amount (e.g., weight) of the negative electrode slurry.

The negative electrode slurry may further include a binder as needed or desired.

The binder improves binding properties of negative active material particles with one another and with a current collector. Examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but the binder is not limited thereto.

An amount (e.g., weight) of the binder may be about 0.5 wt % to about 20 wt %, for example, about 1 wt % to about 15 wt %, or about 1.5 wt % to about 10 wt %, based on the total amount (e.g., weight) of the negative electrode slurry. When the binder is used within the range, negative active material particles are well adhered to one another and show improved coating property when a negative electrode slurry including these particles is coated on a current collector.

A weight per a unit area of the negative electrode, a loading level, may be about 0.001 g/cm$^2$ to about 0.100 g/cm$^2$, for example, about 0.001 g/cm$^2$ to about 0.060 g/cm$^2$, about 0.005 g/cm$^2$ to about 0.060 g/cm$^2$, or about 0.005 g/cm$^2$ to about 0.055 g/cm$^2$.

In general, when a loading level is high, the thickness of an electrode plate may be increased, and the thicker electrode plate increases a moving distance between electrons and Li ions and the thicker electrode plate reduces the high rate charge and discharge (e.g., has a disadvantage about high rate charge and discharge). Accordingly, as the electrode plate is formed as a thin film, the thin electrode plate has a feature of good high rate charge and discharge (e.g., an advantage on high rate charge and discharge) and, for example, a loading level of about 0.001 g/cm$^2$ to about 0.100 g/cm$^2$.

The electrolyte includes a non-aqueous organic solvent and a lithium salt.

The non-aqueous organic solvent serves as a medium for transmitting ions taking part in the electrochemical reaction of a battery.

The non-aqueous organic solvent may use a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate (MPC), ethylpropyl carbonate(EPC), methylethyl carbonate (MEC), ethylene carbonate (EC), propylene carbonate (PC), butylene carbonate (BC), and/or the like, and the ester-based solvent may include methyl acetate, ethyl acetate, n-propyl acetate, dimethylacetate, methylpropionate, ethylpropionate, γ-butyrolactone, decanolide, valerolactone, mevalonolactone, and/or caprolactone. The ether-based solvent may include dibutyl ether, tetraglyme, diglyme, dimethoxyethane, 2-methyltetrahydrofuran, tetrahydrofuran, and/or the like, and the ketone-based solvent may include cyclohexanone, and/or the like. The alcohol-based solvent may include ethyl alcohol, isopropyl alcohol, and/or the like, and the aprotic solvent may include nitriles such as R—CN (where R is a C2 to C20 linear, branched, or cyclic hydrocarbon, a double bond, an aromatic ring, or an ether bond), amides such as dimethylformamide, dioxolanes such as 1,3-dioxolane, sulfolanes, and/or the like.

The non-aqueous organic solvent may be used singularly or in a mixture. When the organic solvent is used in a mixture, the mixture ratio may be controlled in accordance with a suitable or desirable battery performance.

The carbonate-based solvent may be prepared by mixing a cyclic carbonate and a linear carbonate. In some embodiments, the cyclic carbonate and linear carbonate are mixed together to a volume ratio of about 1:1 to about 1:9. When the mixture is used as an electrolyte, it may have enhanced performance.

The non-aqueous organic solvent according to one embodiment may further include an aromatic hydrocarbon-based solvent as well as the carbonate-based solvent. The carbonate-based solvent and aromatic hydrocarbon-based solvent may be mixed together to a volume ratio of about 1:1 to about 30:1.

The aromatic hydrocarbon-based organic solvent may be an aromatic hydrocarbon-based compound represented by Chemical Formula 1.

[Chemical Formula 1]

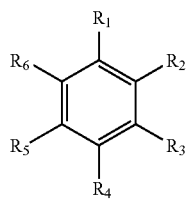

In Chemical Formula 1, $R_1$ to $R_6$ are the same or different and are selected from hydrogen, a halogen, a C1 to C10 alkyl group, a haloalkyl group, and a combination thereof.

Examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The non-aqueous electrolyte may further include vinylene carbonate and/or an ethylene carbonate-based compound represented by Chemical Formula 2 to improve cycle life.

Chemical Formula 2

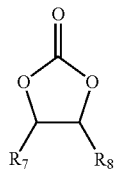

In Chemical Formula 2, $R_7$ and $R_8$ are the same or different and may be each independently hydrogen, a halogen, a cyano group (CN), a nitro group (NO$_2$), or a C1 to C5 fluoroalkyl group, provided that at least one of $R_7$ and $R_8$ is a halogen, a cyano group (CN), a nitro group (NO$_2$), or a C1 to C5 fluoroalkyl group, and $R_7$ and $R_8$ are not simultaneously hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount (e.g., weight) of the additive for improving cycle life may be flexibly used within a suitable or appropriate range.

The lithium salt is dissolved in an organic solvent, supplies a battery with lithium ions, basically operates the rechargeable lithium battery, and improves transportation of the lithium ions between positive and negative electrodes. Examples of the lithium salt include at least one supporting salt selected from LiPF$_6$, LiBF$_4$, LiSbF$_6$, LiAsF$_6$, LiN(SO$_2$C$_2$F$_5$)$_2$, Li(CF$_3$SO$_2$)$_2$N, LiN(SO$_3$C$_2$F$_5$)$_2$, LiC$_4$F$_9$SO$_3$, LiClO$_4$, LiAlO$_2$, LiAlCl$_4$, LiN(C$_x$F$_{2x+1}$SO$_2$)(C$_y$F$_{2y+1}$SO$_2$), wherein, x and y are natural numbers, LiCl, LiI and LiB(C$_2$O$_4$)$_2$ (lithium bis(oxalato) borate, LiBOB). The lithium salt may be used at a concentration of about 0.1 M to about 2.0 M. When the lithium salt is included at the above concentration range, an electrolyte may have excellent performance and lithium ion mobility due to suitable or optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the present disclosure is described with respect to Examples, but the present disclosure is not limited thereto.

EXAMPLE 1

Manufacture of Positive Electrode 85 wt % of $LiCoO_2$ having an average specific surface area of 0.25 $m^2/g$ as a positive active material, 5 wt % of activated carbon having an average specific surface area of 1200 $m^2/g$ (pitch-based, Kuraray Co., Ltd.), 4 wt % of acetylene black having an average specific surface area of 700 $m^2/g$ as a conductive material (Denka Chemical Co., Ltd.), and 6 wt % of polyvinylidene fluoride as a binder were mixed in an N-methyl pyrrolidone solvent, thereby preparing a positive active material slurry.

The positive active material slurry was coated on a 15 μm-thick Al foil, dried at 100° C., and pressed, thereby manufacturing a positive electrode having active mass (positive active material layer) density of 2.6. Herein, the positive electrode had a loading level of 0.00887 $g/cm^2$.

(2) Manufacture of Negative Electrode 92 wt % of amorphous carbon, soft carbon (Hitachi, Ltd.) having an average specific surface area of 2.2 $m^2/g$ as a negative active material, 5 wt % of acetylene black having an average specific surface area of 700 $m^2/g$ (Denka Chemical Co., Ltd.) as a conductive material, and 3 wt % of polyvinylidene fluoride as a binder were mixed in an N-methyl pyrrolidone solvent, thereby preparing a negative active material slurry.

The negative active material slurry was coated on a 10 μm-thick Cu foil, dried at 100° C., and pressed, thereby manufacturing a negative electrode having active mass (negative active material layer) density of 1.0. Herein, the negative electrode had a loading level of 0.00495 $g/cm^2$.

(3) Manufacture of Rechargeable Lithium Battery Cell

A separator was inserted between the positive and negative electrodes obtained in (1) and (2), and the positive and negative electrodes having the separator therebetween were wound to have a cylindrical shape, thereby obtaining a jelly-roll. The separator was a 20 μm-thick F20CA2 microporous film.

The jelly-roll was put in a 18650 size battery case, and an electrolyte solution was injected thereinto, thereby manufacturing a rechargeable lithium battery cell. The electrolyte solution was prepared by dissolving 1.0 M $LiPF_6$ in a mixed solution of ethylene carbonate and ethylmethyl carbonate (3:7 of a volume ratio).

EXAMPLE 2

A rechargeable lithium battery cell was manufactured according to the same method as described with respect to Example 1 except for preparing a positive active material slurry by using $Li(Ni_{0.33}Co_{0.33}Mn_{0.33})O_2$ having an average specific surface area of 1.25 $m^2/g$ as a positive active material and manufacturing a positive electrode having a loading level of 0.009767 $g/cm^2$ by using the positive active material slurry.

EXAMPLE 3

A rechargeable lithium battery cell was manufactured according to the same method as described with respect to Example 1 except for preparing a positive active material slurry by using $Li(Ni_{0.33}Co_{0.33}Mn_{0.33})O_2$ having an average specific surface area of 1.25 $m^2/g$ as a positive active material and manufacturing a positive electrode having a loading level of 0.010201 $g/cm^2$ by using the positive active material slurry.

EXAMPLE 4

A rechargeable lithium battery cell was manufactured according to the same method as described with respect to Example 1 except for preparing a positive active material slurry by using $Li(Ni_{0.33}Co_{0.33}Mn_{0.33})O_2$ having an average specific surface area of 1.25 $m^2/g$ as a positive active material and manufacturing a positive electrode having a loading level of 0.011531 $g/cm^2$ by using the positive active material slurry.

EXAMPLE 5

A rechargeable lithium battery cell was manufactured according to the same method as described with respect to Example 1 except for preparing a positive active material slurry by using $Li(Ni_{0.33}Co_{0.33}Mn_{0.33})O_2$ having an average specific surface area of 0.49 $m^2/g$ as a positive active material and manufacturing a positive electrode having a loading level of 0.009767 $g/cm^2$ by using the positive active material slurry.

EXAMPLE 6

A rechargeable lithium battery cell was manufactured according to the same method as described with respect to Example 1 except for preparing a positive active material slurry by using $LiFePO_4$ having an average specific surface area of 15 $m^2/g$ as a positive active material.

EXAMPLE 7

A rechargeable lithium battery cell was manufactured according to the same method as described with respect to Example 1 except for preparing a positive active material slurry by using $LiFePO_4$ having an average specific surface area of 15 $m^2/g$ as a positive active material but loading the positive active material slurry to a loading level of 0.013305 $g/cm^2$, and changing the loading level of the negative electrode to 0.06435 $g/cm^2$.

EXAMPLE 8

A rechargeable lithium battery cell was manufactured according to the same method as described with respect to Example 1 except for preparing a positive active material slurry by using $LiFePO_4$ having an average specific surface area of 15 $m^2/g$ as a positive active material and manufacturing a positive electrode by loading the positive active material slurry to a loading level of 0.006653 $g/cm^2$.

EXAMPLE 9

A rechargeable lithium battery cell was manufactured according to the same method as described with respect to Example 1 except for preparing a positive active material slurry by using $LiFePO_4$ having an average specific surface area of 15 $m^2/g$ as a positive active material and manufacturing a positive electrode by loading the positive active material slurry to a loading level of 0.006653 g/cm², and changing the loading level of the negative electrode to 0.003713 g/cm².

COMPARATIVE EXAMPLE 1

A rechargeable lithium battery cell was manufactured according to the same method as described with respect to Example 1 except for preparing a positive active material slurry by using 65 wt % of a positive active material, 20 wt % of activated carbon, 5 wt % of a conductive material, and 10 wt % of a binder and manufacturing a positive electrode by using the slurry, and preparing a negative active material slurry by using 85 wt % of a negative active material, 5 wt % of a conductive material, and 10 wt % of a binder and manufacturing a negative electrode by using the slurry.

COMPARATIVE EXAMPLE 2

A rechargeable lithium battery cell was manufactured according to the same method as described with respect to Example 1 except for preparing a positive active material slurry by using 65 wt % of $Li(Ni_{0.33}Co_{0.33}Mn_{0.33})O_2$ having an average specific surface area of 1.25 m²/g as a positive active material, 20 wt % of activated carbon, 5 wt % of a conductive material, and 10 wt % of a binder and manufacturing a positive electrode by using the slurry, and preparing a negative active material slurry by using 85 wt % of a negative active material, 5 wt % of a conductive material, and 10 wt % of a binder and manufacturing a negative electrode by using the slurry.

COMPARATIVE EXAMPLE 3

A rechargeable lithium battery cell was manufactured according to the same method as described with respect to Example 1 except for preparing a positive active material slurry by using 65 wt % of $Li(Ni_{0.33}Co_{0.33}Mn_{0.33})O_2$ having an average specific surface area of 0.49 m²/g as a positive active material, 20 wt % of activated carbon, 5 wt % of a conductive material, and 10 wt % of a binder and manufacturing a positive electrode by using the slurry, and preparing a negative active material slurry by using 85 wt % of a negative active material, 5 wt % of a conductive material, and 10 wt % of a binder and manufacturing a negative electrode by using the slurry.

COMPARATIVE EXAMPLE 4

A rechargeable lithium battery cell was manufactured according to the same method as described with respect to Example 1 except for preparing a positive active material slurry by using 90 wt % of $LiFePO_4$ having an average specific surface area of 15 m²/g as a positive active material, 4 wt % of conductive material, and 6 wt % of a binder without using the activated carbon and manufacturing a positive electrode by using the slurry.

COMPARATIVE EXAMPLE 5

A rechargeable lithium battery cell was manufactured according to the same method as described with respect to Example 1 except for preparing a positive active material slurry by using 90 wt % of a positive active material, 4 wt % of conductive material, and 6 wt % of a binder without using the activated carbon and changing the loading level of the positive electrode to 0.010201 g/cm².

EXPERIMENTAL EXAMPLE 1

Initial Capacity

Each rechargeable lithium battery cell according to Examples 1 to 9 and Comparative Examples 1 to 5 was charged at a current of 0.2 C under a constant current, and the charge was cut-off at a cell voltage of 4.2 V. Subsequently, the cell was discharged at a current of 0.2 C under a constant current, and the discharge was cut-off at a cell voltage of 2.0 V. Then, the charged and discharged cell was measured regarding capacity. The obtained capacity was provided as initial capacity under 0.2 C capacity in Table 1.

EXPERIMENTAL EXAMPLE 2

High Rate Discharge Characteristics

Subsequently, after measuring the initial capacity, the cell was charged at a current of 1 C under a constant current, cut-off the charge at a voltage of 4.2 V, and discharged at a current of 50 C down to 2.0 V. Herein, capacity of the cell was measured and used to calculate a ratio of 50 C discharge capacity relative to 1 C charge capacity (50 C/1 C, %). The results were provided as high rate discharge characteristics under a 50 C rate in Table 1.

EXPERIMENTAL EXAMPLE 3

Cycle-Life Characteristics

In addition, after measuring the initial capacity the cell was 1000 times repetitively charged at 30 C up to 4.2 V and discharged at 30 C down to 2.0 V to calculate residual capacity % of discharge capacity at the 1000 cycle relative to the initial capacity. The result is provided in Table 1.

TABLE 1

| | Specific surface area of positive electrode/ specific surface area of negative electrode | 0.2 C capacity (mAh/g) | 50 C rate (50 C/1 C) (%) | Residual capacity %, (4 C/4 C cycle) 1000th/1st cycle (%) |
|---|---|---|---|---|
| Example 1 | 4.26 | 131 | 82 | 89 |
| Example 2 | 4.74 | 154 | 81 | 85 |
| Example 3 | 4.9 | 154 | 86 | 82 |
| Example 4 | 5.55 | 151 | 84 | 80 |
| Example 5 | 4.71 | 162 | 88 | 88 |
| Example 6 | 4.87 | 127 | 79 | 84 |
| Example 7 | 5.62 | 122 | 77 | 85 |
| Example 8 | 3.65 | 120 | 75 | 81 |
| Example 9 | 4.87 | 122 | 77 | 82 |
| Comparative Example 1 | 13.37 | 156 | 71 | 66 |
| Comparative Example 2 | 13.4 | 166 | 75 | 61 |
| Comparative Example 3 | 13.38 | 127 | 62 | 70 |
| Comparative Example 4 | 13.83 | 133 | 63 | 60 |
| Comparative Example 5 | 1.36 | 156 | 66 | 62 |

As shown in Table 1, Comparative Examples 1 to 5 having the specific surface area per a unit area of the positive electrode relative to the specific surface area per a unit area of the negative electrode out of a range of twice to 7 times showed very deteriorated high rate discharge characteristics and very low residual capacity.

On the contrary, Examples 1 to 9 having the specific surface area per a unit area of the positive electrode relative to the specific surface area per a unit area of the negative electrode within a range of twice to seven times showed greater than or equal to initial capacity compared with the Comparative Examples and very excellent high rate discharge characteristics and remarkably improved residual capacity.

Accordingly, a rechargeable lithium battery cell having high rate capability and cycle-life characteristics may be obtained by adjusting the specific surface area per a unit area relative to the specific surface area per a unit area of the negative electrode within a range of twice to seven times.

It will be understood that when an element or layer is referred to as being "on" another element or layer, it can be directly on the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims, and equivalents thereof.

DESCRIPTION OF SOME OF THE SYMBOLS

100: rechargeable lithium battery
10: positive electrode
20: negative electrode
30: separator
40: electrode assembly
50: case

What is claimed is:

1. A rechargeable lithium battery, comprising:
   a negative electrode and a positive electrode,
   wherein a specific surface area per a unit area of the positive electrode is 3 times to about seven times as large as a specific surface area per a unit area of the negative electrode,
   wherein the specific surface area per the unit area of the positive electrode is calculated from a specific surface area and amount of each component of the positive electrode and a loading level of the positive electrode, and
   wherein the specific surface area per the unit area of the negative electrode is calculated from a specific surface area and amount of each component of the negative electrode and a loading level of the positive electrode.

2. The rechargeable lithium battery of claim 1, wherein the specific surface area per a unit area of the positive electrode is 3.65 times to about six times as large as the specific surface area per a unit area of the negative electrode.

3. The rechargeable lithium battery of claim 1, wherein the positive electrode is prepared using a positive electrode slurry including a positive active material, activated carbon, and a positive conductive material.

4. The rechargeable lithium battery of claim 3, wherein:
   the positive electrode slurry comprises:
   about 60 wt % to about 98 wt % of the positive active material,
   about 0.5 wt % to about 30 wt % of the activated carbon, and
   about 0.5 wt % to about 40 wt % of the positive conductive material,
   based on the total amount of the positive electrode slurry.

5. The rechargeable lithium battery of claim 3, wherein an average specific surface area of the positive active material is about 0.1 $m^2/g$ to about 20 $m^2/g$.

6. The rechargeable lithium battery of claim 3, wherein an average specific surface area of the activated carbon is about 800 $m^2/g$ to about 3000 $m^2/g$.

7. The rechargeable lithium battery of claim 3, wherein an average specific surface area of the conductive material is about 100 $m^2/g$ to about 2000 $m^2/g$.

8. The rechargeable lithium battery of claim 3, wherein the positive active material comprises at least one selected from a lithium nickel-based oxide, a lithium cobalt-based oxide, a lithium iron phosphate-based oxide, a lithium manganese-based oxide, a lithium titanium-based oxide, a lithium nickel manganese-based oxide, a lithium nickel cobalt manganese-based oxide, a lithium nickel cobalt aluminum-based oxide, or a combination thereof.

9. The rechargeable lithium battery of claim 1, wherein a weight per a unit area of the positive electrode is about 0.001 $g/cm^2$ to about 0.100 $g/cm^2$.

10. The rechargeable lithium battery of claim 1, wherein the negative electrode is prepared using a negative electrode slurry including a negative active material and a negative conductive material.

11. The rechargeable lithium battery of claim 10, wherein the negative electrode slurry comprises:
  about 70 wt % to about 98 wt % of the negative active material, and
  about 1.5 wt % to about 30 wt % of the negative conductive material,
  based on the total amount of the negative electrode slurry.

12. The rechargeable lithium battery of claim 10, wherein an average specific surface area of the negative active material is about 0.1 m$^2$/g to about 20 m$^2$/g.

13. The rechargeable lithium battery of claim 10, wherein an average specific surface area of the negative conductive material is about 100 m$^2$/g to about 2000 m$^2$/g.

14. The rechargeable lithium battery of claim 1, wherein a weight per a unit area of the negative electrode is about 0.001g/cm$^2$ to about 0.100 g/cm$^2$.

* * * * *